J. B. RISDON.
EGG SERVING TRAY.
APPLICATION FILED FEB. 15, 1919.
1,322,620.
Patented Nov. 25, 1919.
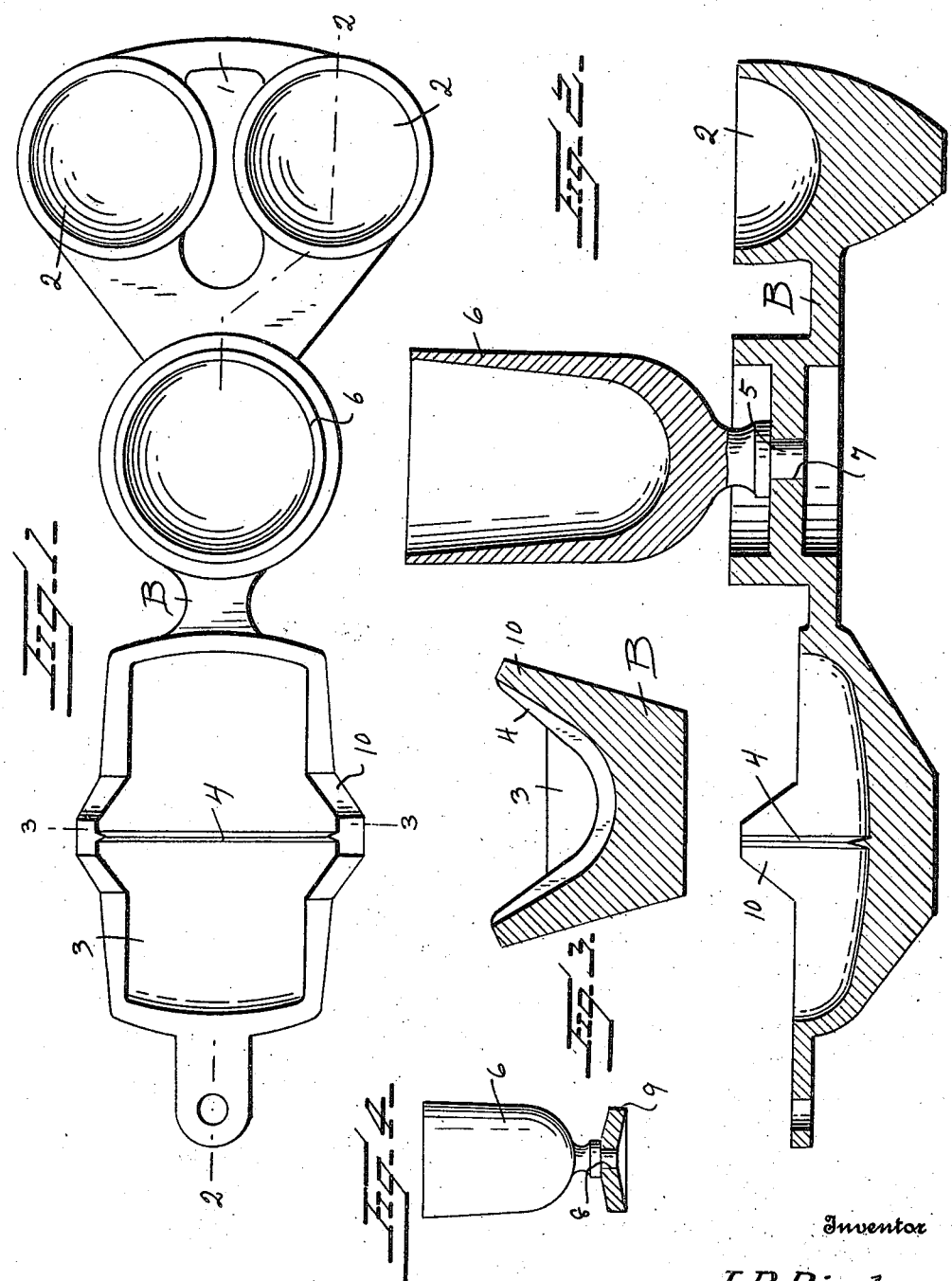
Inventor
J. B. Risdon
By Watson E. Coleman
Attorney

UNITED STATES PATENT OFFICE.

JOSHUA B. RISDON, OF PERHAM, MINNESOTA.

EGG-SERVING TRAY.

1,322,620. Specification of Letters Patent. Patented Nov. 25, 1919.

Application filed February 15, 1919. Serial No. 277,203.

*To all whom it may concern:*

Be it known that I, JOSHUA B. RISDON, a citizen of the United States, residing at Perham, in the county of Otter Tail and State of Minnesota, have invented certain new and useful Improvements in Egg-Serving Trays, of which the following is a specification, reference being had to the accompanying drawings.

This invention relates to an egg serving tray, and has relation more particularly to a device of this general character especially designed and adapted for use in connection with boiled eggs, and it is an object of the invention to provide a device of this general character having novel and improved means whereby the necessary handling of a boiled egg preparatory to eating may be accomplished in a convenient and effective manner.

It is also an object of the invention to provide a novel and improved tray of this general character provided with means whereby an egg may be conveniently broken and wherein holders are provided for the severed portions of an egg, together with a removable cup or container into which the contents of the egg are adapted to be discharged.

The invention consists in the details of construction and in the combination and arrangement of the several parts of my improved egg serving tray whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a tray constructed in accordance with an embodiment of my invention;

Fig. 2 is a sectional view taken substantially on the line 2—2 of Fig. 1;

Fig. 3 is a sectional view taken substantially on the line 3—3 of Fig. 1;

Fig. 4 is a view on a reduced scale partly in section and partly in elevation showing the egg cup detached.

As disclosed in the accompanying drawings, B denotes an elongated body simulating the design of an arrow, and wherein the head portion 1 is provided with a pair of transversely disposed pockets or cups 2, and each of which pockets or cups is adapted to receive and hold the severed portion of an egg, preferably a boiled egg.

The opposite end or tail portion of the body B is provided in its upper face with an elongated depression or concavity 3 having its major axis disposed longitudinally of the body B.

At substantially the longitudinal center thereof, the depression or concavity 3 is intersected by the transversely disposed cutting blade 4 extending upwardly from the wall of the depression or cavity 3 and substantially the same width throughout its length, and which serves to break the shell of an egg when applied within said depression or concavity at substantially the longitudinal center of the egg so that said egg may be readily separated with substantially the elimination of the possibility of the shell crumbling and thereby mixing with the contents of the egg.

After an egg has been severed, the separated portions thereof may be placed within the pockets or cups 2 so that one of said separated parts may be conveniently held and located while a second part is having its contents discharged.

The body B intermediate the head 1 and the tail portion thereof is provided with an opening 7 which is adapted to receive the shank 5 arranged at the axial center of the base of the container or cup 6 into which the contents of the egg are adapted to be discharged. By having the container or cup 6 readily removable a person may readily transfer the egg contents as desired or the egg contents may be eaten directly therefrom.

When the container or cup 6 is removed the shank 5 thereof is adapted to be inserted within an opening or socket 8 arranged at substantially the center of a concavo convex disk 9, and which disk has its convex face upwardly directed so that the same will serve as a convenient base or support of the container or cup 6 when removed from the body B.

I also find it of advantage to have the body B substantially midway of the concavity or depression 3 provided at opposite sides of such concavity or depression with the upstanding extensions 10 and as is clearly indicated in Figs. 2 and 3 of the accompanying drawings the cutting blade 4 is extended to the outer ends of such extensions.

From the foregoing description, it is thought to be obvious that an egg serving tray constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

What I claim is:

A tray of the character described comprising a body provided with a depression, said body at opposite sides of the depression and substantially midway thereof being provided with upstanding extensions, and a cutting blade extending upwardly from the wall of the depression and the adjacent walls of the extensions.

In testimony whereof I hereunto affix my signature in the presence of two witnesses.

JOSHUA B. RISDON.

Witnesses:
ETTA J. STOLL,
H. R. STENGER.